US010223167B2

(12) United States Patent
Kaufman et al.

(10) Patent No.: US 10,223,167 B2
(45) Date of Patent: Mar. 5, 2019

(54) DISCRETE RESOURCE MANAGEMENT

(75) Inventors: Philip John Kaufman, Milwaukee, WI (US); Marcia Elaine Walker, Durham, NC (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 512 days.

(21) Appl. No.: 12/429,814

(22) Filed: Apr. 24, 2009

(65) Prior Publication Data
US 2010/0274611 A1 Oct. 28, 2010

(51) Int. Cl.
| | |
|---|---|
| G05B 19/41 | (2006.01) |
| G06Q 10/06 | (2012.01) |
| G06F 9/50 | (2006.01) |
| G06F 17/30 | (2006.01) |
| G06Q 10/00 | (2012.01) |

(52) U.S. Cl.
CPC ...... *G06F 9/5061* (2013.01); *G06F 17/30312* (2013.01); *G06F 17/30997* (2013.01); *G06Q 10/06* (2013.01); *G06Q 10/063* (2013.01); *Y02D 10/22* (2018.01); *Y02D 10/36* (2018.01); *Y02D 10/45* (2018.01); *Y02P 80/114* (2015.11); *Y02P 90/82* (2015.11); *Y02P 90/84* (2015.11)

(58) Field of Classification Search
USPC ......... 700/99, 295; 705/7.39, 8, 10; 707/1, 5
See application file for complete search history.

(56) References Cited

U.S. PATENT DOCUMENTS

| | | |
|---|---|---|
| 4,039,392 A | 8/1977 | Singh |
| 4,300,125 A | 11/1981 | Loshing et al. |
| 4,341,345 A | 7/1982 | Hammer et al. |
| 4,344,142 A * | 8/1982 | Diehr, II ............. B29C 35/0288 264/325 |
| 4,383,298 A | 5/1983 | Huff et al. |
| 4,624,685 A | 11/1986 | Lueckenotte et al. |

(Continued)

FOREIGN PATENT DOCUMENTS

| | | |
|---|---|---|
| EP | 0977137 A2 | 2/2000 |
| WO | 2004074954 A2 | 9/2004 |
| WO | 2008011427 A2 | 1/2008 |

OTHER PUBLICATIONS

Kennedy, Pat, et al., "In Pursuit of the Perfect Plant—A Business and Technical Guide", Apr. 2008, Chapter 9—Energy Management, pp. 251-283; published by Evolved Technologist Press, New York, New York, USA.

(Continued)

*Primary Examiner* — Scott A Zare
*Assistant Examiner* — Reva R Danzig
(74) *Attorney, Agent, or Firm* — Fletcher Yoder, P.C.

(57) ABSTRACT

Discrete resource tracking systems (and corresponding methodologies) that collect, tag and store resource consumption and usage values associated with industrial environment processes are provided. The specification can track water, air, gas, electricity, or steam consumption and usage view of a discrete (or batch) processes. Emissions and/or effluents associated with processes and sub-processes can also be collected, tagged and stored as desired. These stored resource consumption and usage and/or emissions and/or effluents data elements can be used for a variety of purposes including, but not limited to, simulation, planning, forecasting, valuating, optimizing, etc.

19 Claims, 10 Drawing Sheets

(56) References Cited

U.S. PATENT DOCUMENTS

| | | | |
|---|---|---|---|
| 4,827,395 A | 5/1989 | Anders et al. | |
| 5,043,929 A | 8/1991 | Kramer et al. | |
| 5,202,996 A | 4/1993 | Sugino et al. | |
| 5,251,205 A | 10/1993 | Callon et al. | |
| 5,297,057 A | 3/1994 | Kramer et al. | |
| 5,646,862 A | 7/1997 | Jolliffe et al. | |
| 5,736,983 A | 4/1998 | Nakajima et al. | |
| 5,822,207 A | 10/1998 | Hazama et al. | |
| 5,924,486 A | 7/1999 | Ehlers et al. | |
| 5,983,622 A | 11/1999 | Newburry et al. | |
| 6,012,053 A | 1/2000 | Pant et al. | |
| 6,015,783 A | 1/2000 | von der Osten et al. | |
| 6,076,108 A | 6/2000 | Courts et al. | |
| 6,263,255 B1 | 7/2001 | Tan et al. | |
| 6,281,784 B1 | 8/2001 | Redgate et al. | |
| 6,289,252 B1 | 9/2001 | Wilson et al. | |
| 6,321,983 B1 | 11/2001 | Katayanagi et al. | |
| 6,473,893 B1 | 10/2002 | Kay et al. | |
| 6,507,774 B1 | 1/2003 | Reifman et al. | |
| 6,633,823 B2 | 10/2003 | Barton et al. | |
| 6,701,298 B1* | 3/2004 | Jutsen | G01R 21/133 700/291 |
| 6,732,055 B2 | 5/2004 | Bagepalli et al. | |
| 6,747,368 B2 | 6/2004 | Jarrett, Jr. | |
| 6,785,592 B1 | 8/2004 | Smith et al. | |
| 6,857,020 B1 | 2/2005 | Chaar et al. | |
| 6,859,755 B2 | 2/2005 | Eryurek et al. | |
| 7,043,316 B2* | 5/2006 | Farchmin | G05B 19/4188 700/95 |
| 7,274,975 B2 | 9/2007 | Miller | |
| 7,277,864 B2 | 10/2007 | Ohnemus et al. | |
| 7,409,303 B2 | 8/2008 | Yeo et al. | |
| 7,451,019 B2 | 11/2008 | Rodgers | |
| 7,477,956 B2 | 1/2009 | Huang et al. | |
| 7,531,254 B2 | 5/2009 | Hibbs et al. | |
| 7,565,351 B1 | 7/2009 | Callaghan | |
| 7,587,251 B2 | 9/2009 | Hopsecger | |
| 7,747,416 B2 | 6/2010 | Deininger et al. | |
| 7,788,189 B2 | 8/2010 | Budike, Jr. | |
| 8,068,938 B2 | 11/2011 | Fujita | |
| 8,271,363 B2 | 9/2012 | Branscomb | |
| 2001/0011368 A1 | 8/2001 | Graser et al. | |
| 2002/0013744 A1 | 1/2002 | Tsunenari et al. | |
| 2002/0026343 A1 | 2/2002 | Duenke | |
| 2002/0066072 A1 | 5/2002 | Crevatin | |
| 2002/0099464 A1 | 7/2002 | O'Connor et al. | |
| 2002/0099804 A1 | 7/2002 | O'Connor et al. | |
| 2002/0116239 A1 | 8/2002 | Reinsma et al. | |
| 2002/0128933 A1 | 9/2002 | Day et al. | |
| 2002/0168621 A1 | 11/2002 | Cook et al. | |
| 2002/0169582 A1 | 11/2002 | Eryurek et al. | |
| 2002/0178047 A1 | 11/2002 | Or et al. | |
| 2002/0198755 A1 | 12/2002 | Birkner et al. | |
| 2003/0014500 A1 | 1/2003 | Schleiss | |
| 2003/0028527 A1 | 2/2003 | Crosby et al. | |
| 2003/0061091 A1* | 3/2003 | Amaratunga | G06Q 10/06375 705/7.31 |
| 2003/0088370 A1 | 5/2003 | Bagepalli et al. | |
| 2003/0110065 A1 | 6/2003 | Twigge-Molecey | |
| 2003/0110369 A1 | 6/2003 | Fish et al. | |
| 2003/0171851 A1 | 9/2003 | Brickfield et al. | |
| 2003/0221119 A1 | 11/2003 | Geiger et al. | |
| 2004/0088119 A1 | 5/2004 | Landgraf | |
| 2004/0107345 A1 | 6/2004 | Brandt et al. | |
| 2004/0117240 A1 | 6/2004 | Ness et al. | |
| 2004/0143467 A1 | 7/2004 | McAllister et al. | |
| 2004/0158506 A1 | 8/2004 | Wille | |
| 2004/0199294 A1 | 10/2004 | Fairlie et al. | |
| 2004/0205412 A1 | 10/2004 | Staron et al. | |
| 2004/0249697 A1 | 12/2004 | Ohnemus et al. | |
| 2004/0260489 A1 | 12/2004 | Mansingh et al. | |
| 2004/0261673 A1 | 12/2004 | Allen et al. | |
| 2005/0015287 A1 | 1/2005 | Beaver | |
| 2005/0034023 A1 | 2/2005 | Maturana et al. | |
| 2005/0065971 A1 | 3/2005 | Honda | |
| 2005/0143865 A1 | 6/2005 | Gardner | |
| 2005/0144154 A1* | 6/2005 | DeMesa | G06F 17/30964 |
| 2005/0171910 A1 | 8/2005 | Wu et al. | |
| 2005/0198241 A1 | 9/2005 | Pavlik et al. | |
| 2005/0198333 A1 | 9/2005 | Dinges | |
| 2005/0234904 A1 | 10/2005 | Brill et al. | |
| 2005/0278296 A1 | 12/2005 | Bostwick | |
| 2006/0026145 A1 | 2/2006 | Beringer et al. | |
| 2006/0248002 A1 | 11/2006 | Summer et al. | |
| 2007/0038646 A1 | 2/2007 | Thota | |
| 2007/0073750 A1 | 3/2007 | Chand et al. | |
| 2007/0078736 A1 | 4/2007 | Chand et al. | |
| 2007/0168213 A1 | 7/2007 | Comrie | |
| 2007/0226068 A1 | 9/2007 | Keil et al. | |
| 2007/0283030 A1 | 12/2007 | Deininger et al. | |
| 2008/0015975 A1 | 1/2008 | Ivchenko et al. | |
| 2008/0046387 A1 | 2/2008 | Gopal et al. | |
| 2008/0046407 A1 | 2/2008 | Shah et al. | |
| 2008/0059457 A1* | 3/2008 | Ohnemus | G06Q 30/0201 |
| 2008/0079560 A1 | 4/2008 | Hall et al. | |
| 2008/0127779 A1 | 6/2008 | Morales Cerda et al. | |
| 2008/0154749 A1 | 6/2008 | D'hooghe et al. | |
| 2008/0255889 A1 | 10/2008 | Geisler et al. | |
| 2008/0255899 A1 | 10/2008 | McConnell et al. | |
| 2008/0270272 A1 | 10/2008 | Branscomb | |
| 2008/0272934 A1 | 11/2008 | Wang et al. | |
| 2008/0319812 A1 | 12/2008 | Sousa et al. | |
| 2009/0083843 A1 | 3/2009 | Wilkinson, Jr. et al. | |
| 2009/0099887 A1 | 4/2009 | Sklar et al. | |
| 2009/0100159 A1 | 4/2009 | Extra | |
| 2009/0132176 A1 | 5/2009 | McConnell et al. | |
| 2009/0138415 A1 | 5/2009 | Lancaster | |
| 2009/0177505 A1 | 7/2009 | Dietrich et al. | |
| 2009/0222307 A1 | 9/2009 | Beaver | |
| 2009/0281674 A1 | 11/2009 | Taft | |
| 2009/0281677 A1* | 11/2009 | Botich | G06Q 10/00 700/295 |
| 2009/0313164 A1 | 12/2009 | Hoglund | |
| 2009/0319315 A1 | 12/2009 | Branscomb | |
| 2010/0023360 A1 | 1/2010 | Nadhan | |
| 2010/0030601 A1 | 2/2010 | Warther et al. | |
| 2010/0042455 A1* | 2/2010 | Liu | G06Q 10/06 705/7.12 |
| 2010/0057480 A1 | 3/2010 | Arfin et al. | |
| 2010/0088136 A1 | 4/2010 | Cheng et al. | |
| 2010/0100405 A1 | 4/2010 | Lepore et al. | |
| 2010/0131343 A1 | 5/2010 | Hamilton | |
| 2010/0138003 A1 | 6/2010 | August et al. | |
| 2010/0168930 A1* | 7/2010 | Bischof | G05B 23/0243 700/291 |
| 2010/0217642 A1 | 8/2010 | Crabtree et al. | |
| 2010/0217651 A1 | 8/2010 | Crabtree et al. | |
| 2010/0218108 A1 | 8/2010 | Crabtree et al. | |
| 2010/0249975 A1 | 9/2010 | Rezayat | |
| 2010/0262445 A1 | 10/2010 | DeSorbo | |
| 2010/0274367 A1 | 10/2010 | Kaufman et al. | |
| 2010/0274377 A1 | 10/2010 | Kaufman et al. | |
| 2010/0274602 A1 | 10/2010 | Kaufman et al. | |
| 2010/0274603 A1 | 10/2010 | Walker et al. | |
| 2010/0274612 A1 | 10/2010 | Walker et al. | |
| 2010/0274629 A1 | 10/2010 | Walker et al. | |
| 2010/0274810 A1 | 10/2010 | Walker et al. | |
| 2010/0275147 A1 | 10/2010 | Kaufman et al. | |
| 2010/0292856 A1 | 11/2010 | Fujita | |
| 2010/0314940 A1 | 12/2010 | Palmer et al. | |
| 2010/0318233 A1 | 12/2010 | Yunes et al. | |
| 2010/0332373 A1 | 12/2010 | Crabtree et al. | |
| 2011/0046800 A1 | 2/2011 | Imes et al. | |
| 2011/0071721 A1 | 3/2011 | Gilfillan et al. | |
| 2011/0172838 A1 | 7/2011 | Pai et al. | |
| 2011/0273022 A1 | 11/2011 | Dennis et al. | |

OTHER PUBLICATIONS

Kouloura, et al., "A Systems Approach to Corporate Sustainability in Energy Management of Industrial Units", IEEE Systems Journal, vol. 2, No. 4, Dec. 2008, pp. 442-452.

(56) References Cited

OTHER PUBLICATIONS

Yang, et al., "Eco-Design for Product Lifecycle Sustainability", IEEE International Conference on Industrial Informatics, 2006, pp. 548-553.

U.S. Appl. No. 13/275,983, filed Oct. 18, 2011, David D. Brandt.

Jawahir, I. S., et al. "Total life-cycle considerations in product design for sustainability: A framework for coomprehensive evaluation." Proc. 10th Int. Research/Expert Conf. (TMT 2006), Barcelona, Spain, 2006.

A.D. Jayal, F. Badurdeen, O.W. Dillon Jr., I.S. Jawahir, Sustainable manufacturing: Modeling and optimization challenges at the product, process and system levels, CIRP Journal of Manufacturing Science and Technology, vol. 2, Issue 3, 2010, pp. 144-152, ISSN 1755-5817.

Dillenburg, Stephen, Timothy Greene, and O. Homer Erekson. "Aproaching socially responsible investment with a comprehensive ratings scheme: total social impact." Journal of Business Ethics 43.3 (2003): 167-177.

European Search Report dated Nov. 4, 2010 for European Patent Application No. EP 10 16 0737, 9 pages.

European Search Report completed Aug. 6, 2010 for European Patent Application No. EP 10 16 0810, 2 pages.

EPO : Notice from the European patent Office dated Oct. 1, 2007 concerning business methods. Official Journal of The European Patent Office, vol. 30, No. 11, Nov. 1, 2007, pp. 592-593.

Dietmair A, et al., "Energy Consumption Modeling and Optimization for Production Machines". Sustainable energytechnologies, 2008. ICSET 2008. IEEE International Conference on IEEE, Piscataway, NJ, USA, Nov. 24, 2008, pp. 574-579, XP031442235, ISBN: 978-1-4244-1887-9.

European Search Report for European Patent Application No. 10160649.9-1238 dated Sep. 23, 2010, 8 pages.

European Search Report for European Patent Application No. 10160581.4-1238 dated Sep. 23, 2010, 8 pages.

European Search Report for European Patent Application No. 10160673.9-1238 dated Sep. 23, 2010, 9 pages.

Kiritsis D, et al., Research issues on product lifecycle management and information tracking using smart embedded systems. Advanced Engineering Informatics, Elsevier Lnkd—DOI: 10.1016/J. AEI. 2004.09.005, vol. 17, No. 3-4, Jul. 1, 2003, pp. 189-202, XP004595481 ISSN: 1474-0346.

Y-S Ma, et al., Product Lifecycle Analysis and Optimization in an Eco-value Based, Sustainable and Unified Approach. Industrial Informatics, 2006 IEEE International Conference on, IEEE, PI, Aug. 1, 2006, pp. 537-541 XP031003409, ISBN: 978-0-7803-9700-2.

Seref Erkayhan Ed—Ding Zhen-Hua et al., The Use of RFID enables a holistic Information Management within Product Lifecycle Management (PLM). RFID EURASIA, 2007 1st Annual, IEEE, PI Sep. 1, 2007, pp. 1-4, XP031153342. ISBN: 978-975-1-5660-1.

European Search Report for European Patent Application No. 10160811.5 dated Sep. 20, 2010, 9 pages.

European Search Report for European Application No. 10160585.5-1527 / 2254061 datedDec. 20, 2010, 9 pages.

OA dated Feb. 16, 2011 for U.S. Appl. No. 12/429,813, 21 pages.

GE Energy. "Energy and Asset Performance—Fact Sheet." Sep. 2005. General Electric Company. Published online at [http://www.gepower.com/prod_serv/serv/industrial_service/en/downloads/gea14163_eap.pdf], retrieved Apr. 13, 2009. 2 pages.

ABB. "Energy Management Solution for the Process Industry—Energy Management and Optimization." Apr. 6, 2007. Published online at [http://library.abb.com/global/scot/scot313.nsf/veritydisplay/5e48etb88a7e1cbac125734600737b02/$File/3BFI405000R4001_en_Energy_Management_and_Optimization_3.5.pdf], retrieved Apr. 13, 2009. 12 pages.

ABB. "Energy Management and Optimization for the Process Industries—Advanced IT Tools for Planning, Monitoring, Controlling, and Reporting Energy System Operations." Published online at [http://library.abb.com/global/scot/scot296.nsf/veritydisplay/bd2a898a24267c46c12571c70070a851/$File/3BFI402000R3001_en_Advanced_IT_Tools_for_Energy_Management.pdf], retrieved Apr. 13, 2009. 6 pages.

\* cited by examiner

DISCRETE RESOURCE MANAGEMENT

BACKGROUND

The current economic climate and governmental pressures to reduce energy demands and greenhouse gas emission will force manufacturers to explore energy reductions on the plant floor. Conventionally, basic monitoring of energy is performed only at the facility level. Understanding energy usage patterns is accomplished by manually reviewing the logged data for obvious discrepancies or trends in consumption. These manual analysis processes are extremely labor intensive and require human approximations and interpolations. Accordingly, accuracy is not easily achieved, if at all. Rather, these calculations and approximations are prone to error and thus, oftentimes result in meaningless data.

The current demand management systems are nothing more than infrastructure maximum capacity load shedding applications. Newer systems may include the ability to transfer to on-site generation with auxiliary diesel or natural gas generators. Essentially, the facility level tracking of energy makes true demand management decisions impossible in today's industrial environment.

SUMMARY

The following presents a simplified summary of the specification in order to provide a basic understanding of some aspects of the specification. This summary is not an extensive overview of the functionality. It is not intended to identify key/critical elements of the specification or to delineate the scope. Its sole purpose is to present some concepts of the specification in a simplified form as a prelude to the more detailed description that is presented later.

A discrete resource tracking system is provided that can collect, tag and store resource consumption and usage values associated with industrial environment processes. For example, water, air, gas, electricity, or steam consumption can be measured in view of a discrete (or batch) process. In other aspects, emissions and/or effluents associated with processes and sub-processes can be collected, tagged and stored as desired. These stored energy and/or emissions and/or effluents data elements can be used for a variety of purposes including, but not limited to, simulation, planning, forecasting, valuating, optimizing, etc.

In other aspects, tagging schemes can be applied that facilitate comprehensive use of collected resource consumption and usage and emissions and/or effluents data. These tagging schemes can be designed as granular as desired in order to describe quantifiable processes within an industrial environment. These quantifiable processes can be related to a number of products produced in view of an amount of resource consumption and usage, for example.

To the accomplishment of the foregoing and related ends, certain illustrative aspects of the specification are described herein in connection with the following description and the annexed drawings. These aspects are indicative, however, of but a few of the various ways in which the principles of the functionality can be employed and the subject specification is intended to include all such aspects and their equivalents. Other advantages and novel features of the specification will become apparent from the following detailed description when considered in conjunction with the drawings.

DETAILED DESCRIPTION

Figure 1:
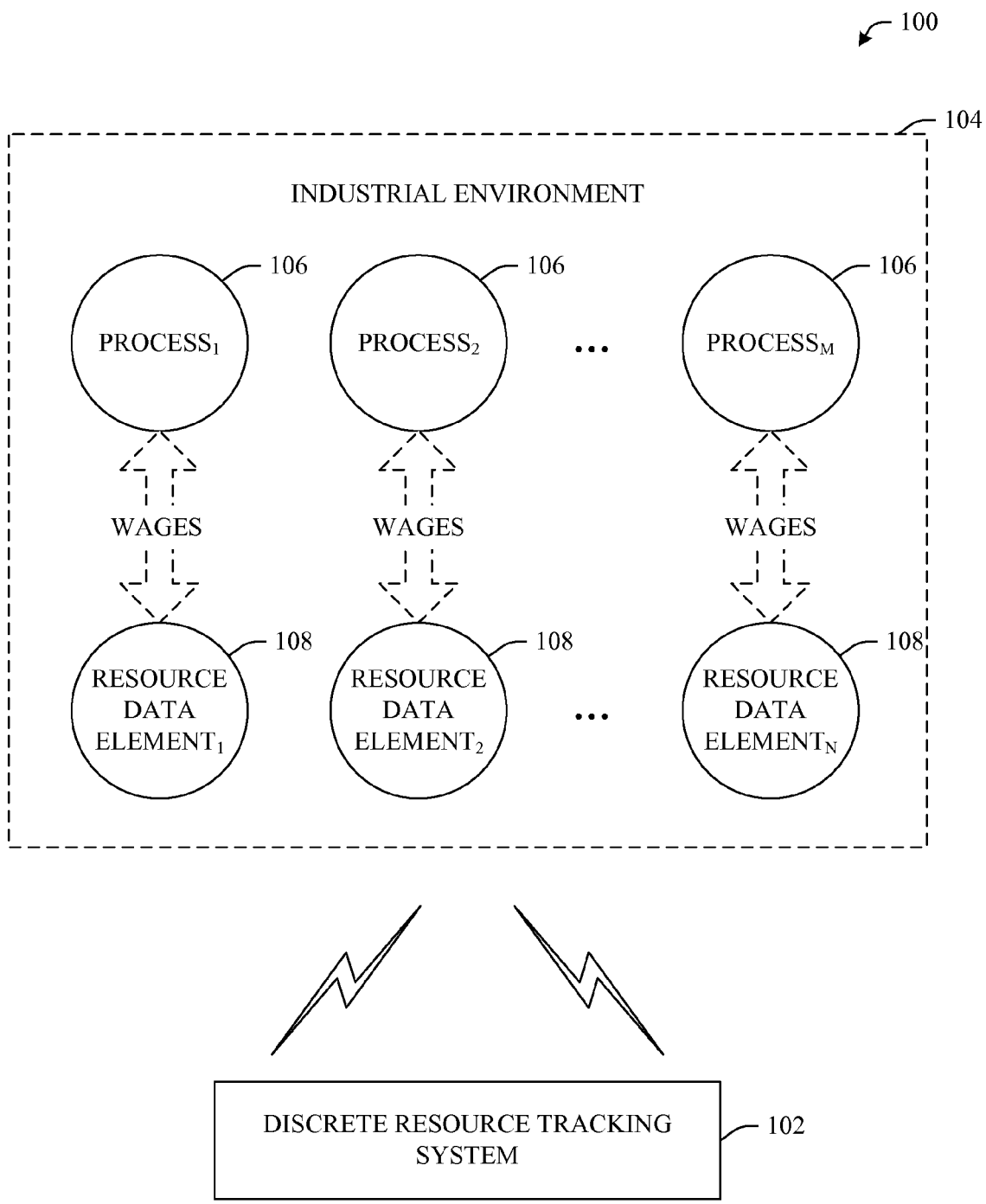
FIG. 1 illustrates an example block diagram of a system that facilitates collection of resource data related to granular processes within an industrial environment.

The functionality is now described with reference to the drawings, wherein like reference numerals are used to refer to like elements throughout. In the following description, for purposes of explanation, numerous specific details are set forth in order to provide a thorough understanding of the subject specification. It may be evident, however, that the functionality can be practiced without these specific details. In other instances, well-known structures and devices are shown in block diagram form in order to facilitate describing the functionality.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, FIG. 1 illustrates a system 100 that facilitates discrete resource management and tracking in accordance with aspects of the specification. While the aspects described herein are directed to "resources," it is to be understood that a resource is intended to refer to both resource consumption and usage as well as emissions and/or effluents of such resources. By way of example and not limitation, energy sources can include water, air, gas, electric and steam. These example energy sources are referred to collectively in the specification and figures as "WAGES" which is an acronym for Water, Air, Gas, Electric and Steam. However, it is to be understood that the WAGES acronym is not intended to limit the types of energy sources contemplated by the specification. Rather, WAGES is intended to include energy, usage, emissions, effluents, etc. associated with resources used in connection with industrial environments. For instance, solar can also be considered an energy source that is to be considered within the scope of this disclosure and claims appended hereto.

Industrial resource consumption and usage can be impacted by at least two major variables, environmental changes and production output. Environmental changes (e.g., air temperature, humidity, time of day) on facilities' resource consumption and usage can be measured, trended, and controlled through energy tracking software and building automation systems. Conventionally, production output's granular impact on resource consumption and usage has generally been estimated and not measured. In contrast, the specification enables discrete data elements related to granular aspects of processes to be captured and stored. These discrete data elements can be employed to simulate, plan, forecast, react, etc.

It is to be understood that an industrial process is intended to include all processes that may be present within an industrial environment. For example, processes are to include batch, job and continuous processes. Additionally, process is not intended to be limited to process manufacturing. For instance, discrete manufacturing is also to be included within the scope of the definition of process defined and used herein. It is to be understood that these broad definitions are to be included within the scope of the specification and claims appended hereto.

Conventionally, there were no direct incentives on the plant floor to reduce resource consumption and usage because usage and associated energy could not be measured against production volumes. Rather, resource costs were merely considered fixed allocations, generally, allocated per month per square foot. By enabling discrete resource monitoring associated with processes, the specification enables manufactures to make better production decisions based on energy availability, real time pricing, and emission caps. Additionally, the specification describes an architecture that optimizes and manages resource consumption, usage and emissions and/or effluents as related not only to the facility infrastructure but also the granular processes on the production floor.

As described herein, conventional products and systems approach energy and emission management at a macro level, from the facility infrastructure, e.g., substations, switchgears, emission monitors. These conventional systems apply production related information against the overall facility resource data in an attempt to manually calculate or otherwise to infer energy performance. Other conventional products focus resource consumption, usage and emission/effluent management on a building management level, e.g., data centers, lighting, chiller and boilers.

In contrast, the specification provides a unique perspective of viewing resource consumption and usage from the production floor back to the facility infrastructure. In operation, the system 100 can include a discrete resource tracking system 102 that collects resource data on the plant floor. This resource data can be employed to enhance recipe optimization and regulatory requirements, among other purposes.

In particular, the specification can extract resource consumption and usage data from individual processes and sub-processes on the plant floor. This extracted data can include both a resource consumption/usage component as well as a descriptive component that defines contextual factors to better define the raw resource data. In aspects, the consumption data can be correlated to production output and stored for subsequent uses. For example, the data can be used to apply standard production modeling tools for production consumption, usage and emission/effluent forecasting and optimization. Additionally, the specification can extend conventional existing facility demand management systems to include production. Still further, the specification's discrete resource tracking functionality can link the system to Demand Response and Smart Grid (DRSG), Water Demand Management, as well as, Cap and Trade/Tax systems.

As shown in FIG. 1, an industrial environment 104 (e.g., production floor) can include 1 to M processes, where M is an integer. As used herein, a process can refer to most any portion of a manufacturing process and/or system. In one example, a process can be a mixing process and amount of product while, in another example, a process can refer to a mixer. Essentially, the specification enables a production floor within an industrial environment to be granularized such that most any portion of production can be measured and monitored with regard to resources used (and/or emissions and effluents discharged).

In a particular aspect, 1 to N resource data elements 108 can be captured as they relate to the processes, where N is an integer. As described supra, resource criteria related to WAGES can be captured as they relate to particular processes in a production or industrial environment. The discrete resource tracking system can capture these data elements 108, associate them to discrete processes, mark the data, for example with process specific tags, and finally store the data for subsequent use. Following is more detailed description of functionalities of the discrete resource tracking system 102.

Figure 2:
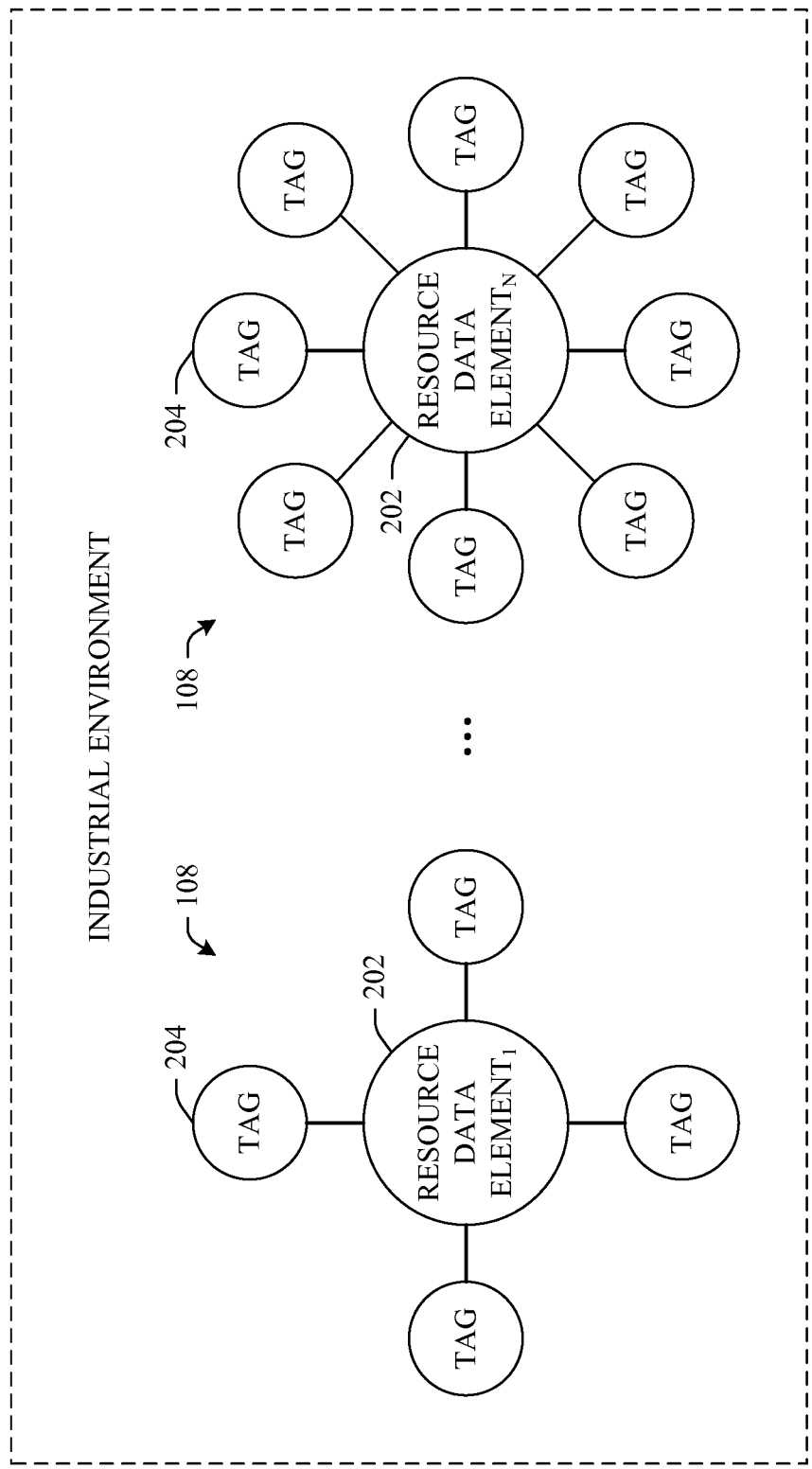
FIG. 2 illustrates example illustrations of tagged resource data elements in accordance with aspects of the specification.

FIG. 2 illustrates an example of resource data elements 108 in accordance with aspects. As shown, the data elements 108 can include a quantified data element 202, for example, a number of kilowatts or gallons used in a process. Tags 204 can be applied to the data element to describe contextual criteria associated with the particular data element 202. For example, tags can describe a process, machine, quantity of product produced, environmental conditions (e.g., air temperature, humidity . . . ), among other criteria. Essentially, most any information that relates to a process or industrial environment can be applied as a tag element 204. As described supra, resource is not intended to be limited to WAGES consumed or used but, also is intended to include emissions and/or effluents related to such consumption and usage as appropriate and/or desired.

It is to be understood and appreciated that the granularity of tags 204 embedded or otherwise associated to data elements 202 can be system or user defined as appropriate. For example, in one scenario, a data element 202 may only have a few tags that identify a process phase, time of day and day of week. In another example, the tags 204 might include a very specific sub-process identification, a number of widgets or amount of product produced in the sub-process, the time of day, day of week, identity of operators or factory workers, environmental conditions (e.g., ambient temperature, humidity . . . ), etc. In other words, the specification contemplates use of most any number of tags or descriptive information markers.

Figure 3:
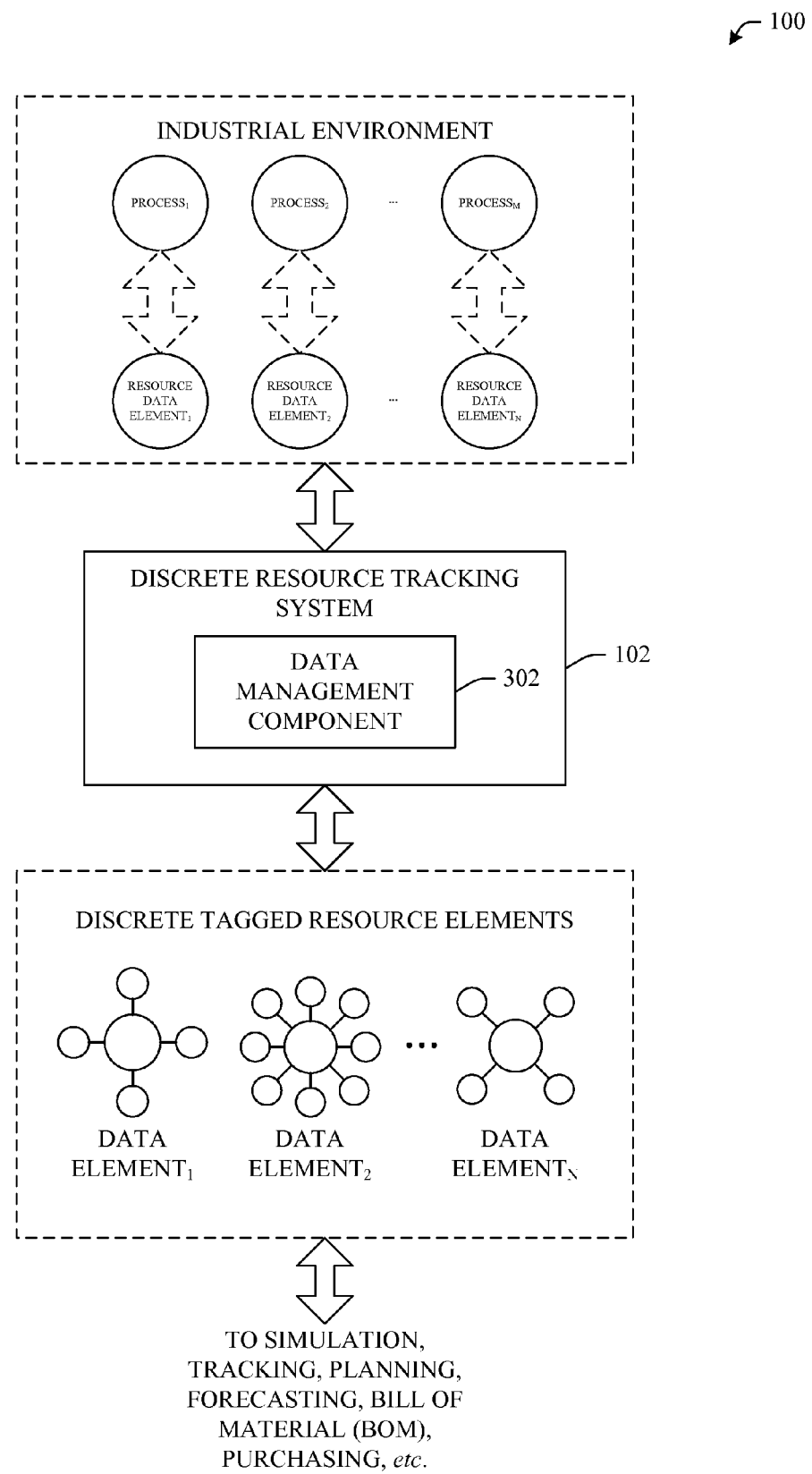
FIG. 3 illustrates an alternative example block diagram of a system that facilitates collection of resource data related to granular processes within an industrial environment.

Referring now to FIG. 3, an alternative block diagram of an example system 100 is shown in accordance with aspects. Essentially, FIG. 3 illustrates that the discrete resource tracking system 102 can include a data management component 302 that facilitates collection, marking and storage of discrete resource elements. Operation of the data management component 302 will be described in more detail in connection with the figures that follow.

As shown in FIG. 3, the discrete resource tracking system 102 can effectively monitor an industrial environment, for example, at a factory floor granular level. In other words, individual processes and sub-processes can be monitored with respect to resource consumption, usage, waste flow and/or emissions and/or effluents. In aspects, raw energy quantities can be collected as related to particular processes. Additionally, the data management component 302 is capable of tagging or otherwise marking the raw energy measurement data. For instance, contextual criteria including, but not limited to, power quality factors, environmental conditions, number of widgets or products produced in a corresponding elapsed timeframe, etc. can be collected and associated to the raw data elements.

As illustrated, these discrete tagged resource elements can be used for a variety of purposes ranging from forecasting to troubleshooting. In aspects, the data can be used for simulation and/or planning of factory processes. These simulation scenarios can be employed to optimize or enhance efficiency of factory operations. In other aspects, the data can be applied to a bill of material (BOM) related to a factory or manufacturing process. Here, the energy line item within a BOM can be considered in decisions to enhance or optimize factory process or workflow. Additionally, inclusion of resource data within the BOM will enable companies to more effectively and accurately forecast costs associated with manufacturing or other industrial processes.

Figure 4:
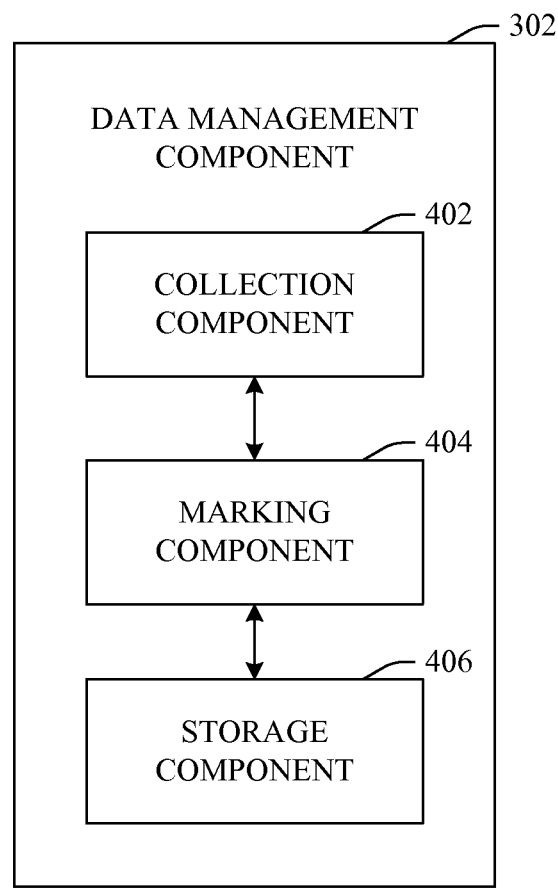
FIG. 4 illustrates an example block diagram of a data management component in accordance with aspects of the specification.

Turning now to FIG. 4, an example block diagram of a data management component 302 is shown in accordance with aspects. As illustrated, the data management component 302 can include a collection component 402, a marking component 404 and a storage component 406. While three sub-components (402, 404, 406) are shown, it is to be understood that aspects can employ any subset of the components and corresponding functionality. For instance, if discrete and granular raw resource data is all that is desired, aspects can be employed without specific marking or tagging functionality of the marking component 404. Similarly, if real-time (or near real-time) analysis of data is employed, aspects may be employed without a storage component 406. The functionality of each of these sub-components will be better described upon a review of the methodologies of FIGS. 5 thru 8 that follow.

Figure 5:
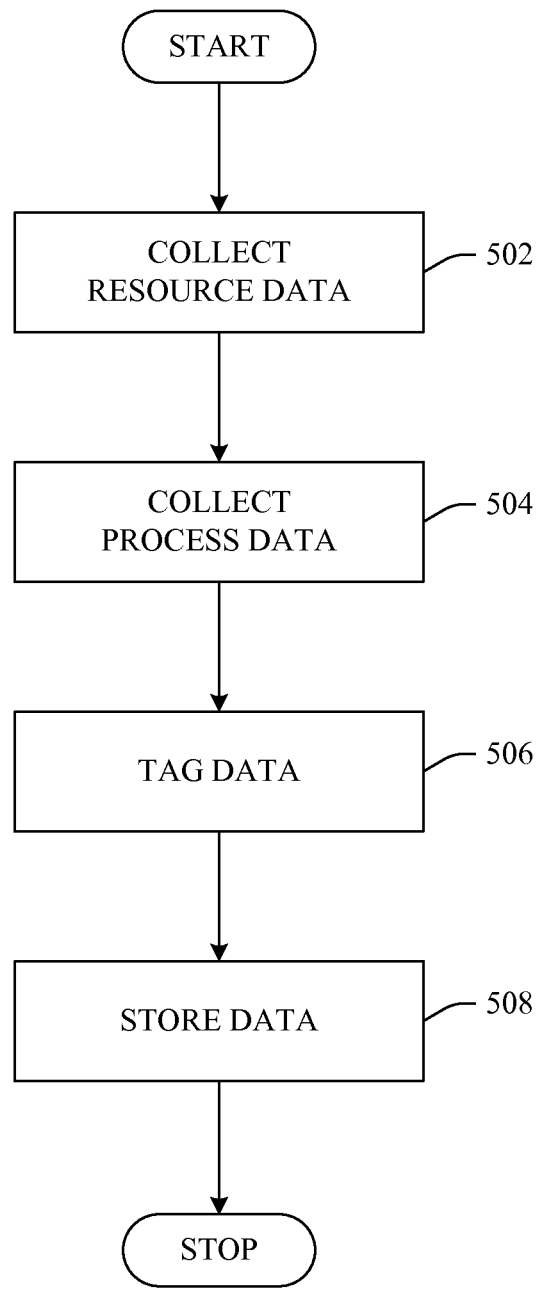
FIG. 5 illustrates an example flow chart of procedures that facilitate collection, tagging and storage of resource data in accordance with aspects of the specification.

FIG. 5 illustrates a methodology of capturing discrete resource data in accordance with an aspect of the specification. While, for purposes of simplicity of explanation, the one or more methodologies shown herein, e.g., in the form of a flow chart, are shown and described as a series of acts, it is to be understood and appreciated that the subject specification is not limited by the order of acts, as some acts may, in accordance with the specification, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the specification.

At 502, resource data is collected, for example, raw energy flow data is collected from a process or sub-process upon an industrial floor. Similarly, at 504, data related to the process is collected. Here, for example, data that quantifies product associated to the energy consumed can be captured. Additionally, environmental and other contextual data can be captured to enhance meaningfulness of the resource data, e.g., in simulation, planning, forecasting or other scenarios. With reference again to FIG. 4, the collection sub-component 402 can be employed to collect or otherwise obtain this information. In operation, the collection component 402 can include or otherwise communicate with a variety of sensors, detectors or monitors capable of capturing the raw resource data together with the descriptive and energy-related information.

At 506, the data can be tagged, for example, date-stamped. Additionally, other captured data can be applied, embedded or associated in a tagging or marking manner. For instance, identification of associated process(es), environmental factors, contextual factors, or the like can be used to tag the data. In operation, a marking component (e.g., 404 of FIG. 4) can be used to tag the data. It is to be understood that, in addition to information, tags can also include links to log reports, graphs, or the like that can be used to enhance optimization of energy management at a discretized level.

If desired, the data can be stored at 508. In examples, the data can be locally stored (e.g., at a machine, sensor or device associated with a process). In other aspects, the data can be remotely stored, for example in a server, distributed network of stores, or cloud-based store. As described supra, this information can be employed to simulate, plan, forecast, reduce carbon-foot-prints, manage or reduce emissions and/or effluents as well as to make other decisions, such as power management and revenue decisions.

Figure 6:
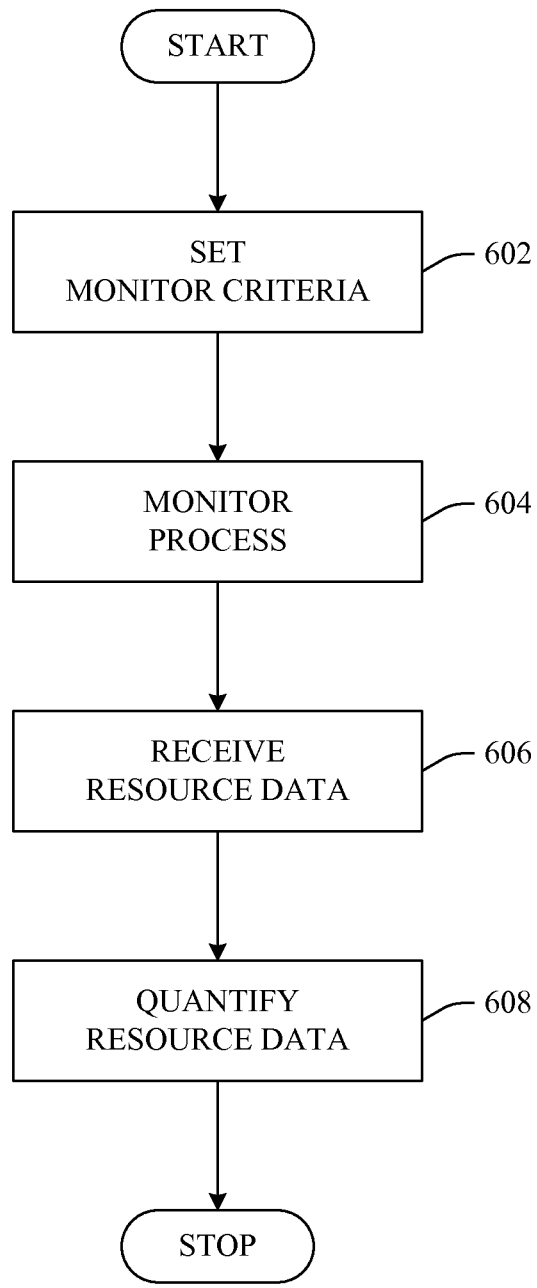
FIG. 6 illustrates an example flow diagram of procedures that facilitate collection of resource data in accordance with aspects of the specification.

FIG. 6 is an example flowchart of collecting resource data (502 of FIG. 5). As shown, monitor criteria can be set at 602. For example, criteria can be based upon production schedules, individual processes (e.g., discrete or batch), environmental conditions, process locations, etc. At 604, process(es) can be monitored with respect to resource consumption and usage (and/or emissions and/or effluents). At 606, individual resource quantities can be captured as they relate to a defined process. For instance, the amount of electricity used to operate a machine can be captured and later related to a particular production value.

In other words, at 608, the resource data can be quantified as it relates to the process being monitored. In aspects, the raw data can be converted to appropriate units. Additionally, the raw data can be quantified as a function of process operations. For instance, X widgets were produced in the time that Y amount of energy was used. As will be understood, this granular measurement enables sophisticated analysis and understanding of costs expended in an industrial environment.

Figure 7:
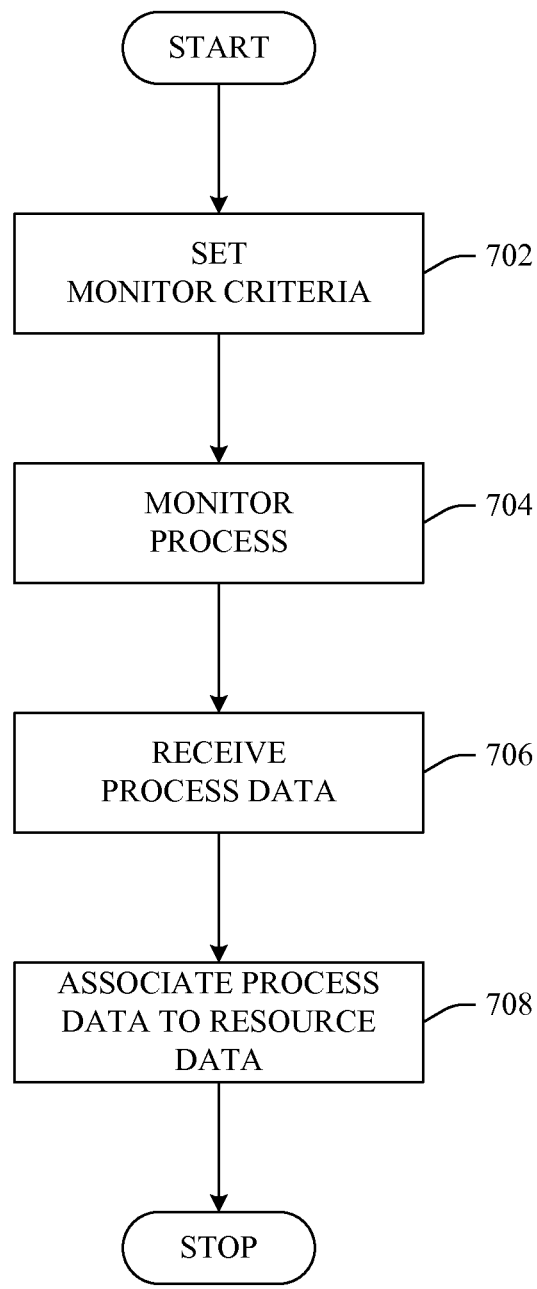
FIG. 7 illustrates an example flow diagram of procedures that facilitate collection of process data in accordance with aspects of the specification.

Turning now to FIG. 7, an example flowchart of collecting process data (504 of FIG. 5) in accordance with aspects is shown. As described with regard to FIG. 6, monitor criteria can be set at 702. Here, for example, the system can be set to trigger monitoring of environmental factors upon an ambient temperature reaching a specified level. As will be understood, countless examples of triggering events as well as types or criteria of data that can be collected exist. All of these alternative examples are to be included within the spirit and scope of the specification described and claimed herein. Once criteria is set (or otherwise determined), the process (or sub-process(es)) can be monitored at 704.

As monitoring is on-going, process data can be received at 706. Accordingly, as mentioned above, the process data can be associated to captured resource consumption and usage (and/or emissions and/or effluents) data. For instance, WAGES data can be captured, quantified and related to process criteria in order to establish a comprehensive understanding of industrial environment costs. In particular aspects, resource data can be included upon a BOM to better assist organizations in quantifying overhead and costs associated at the factory floor.

Figure 8:
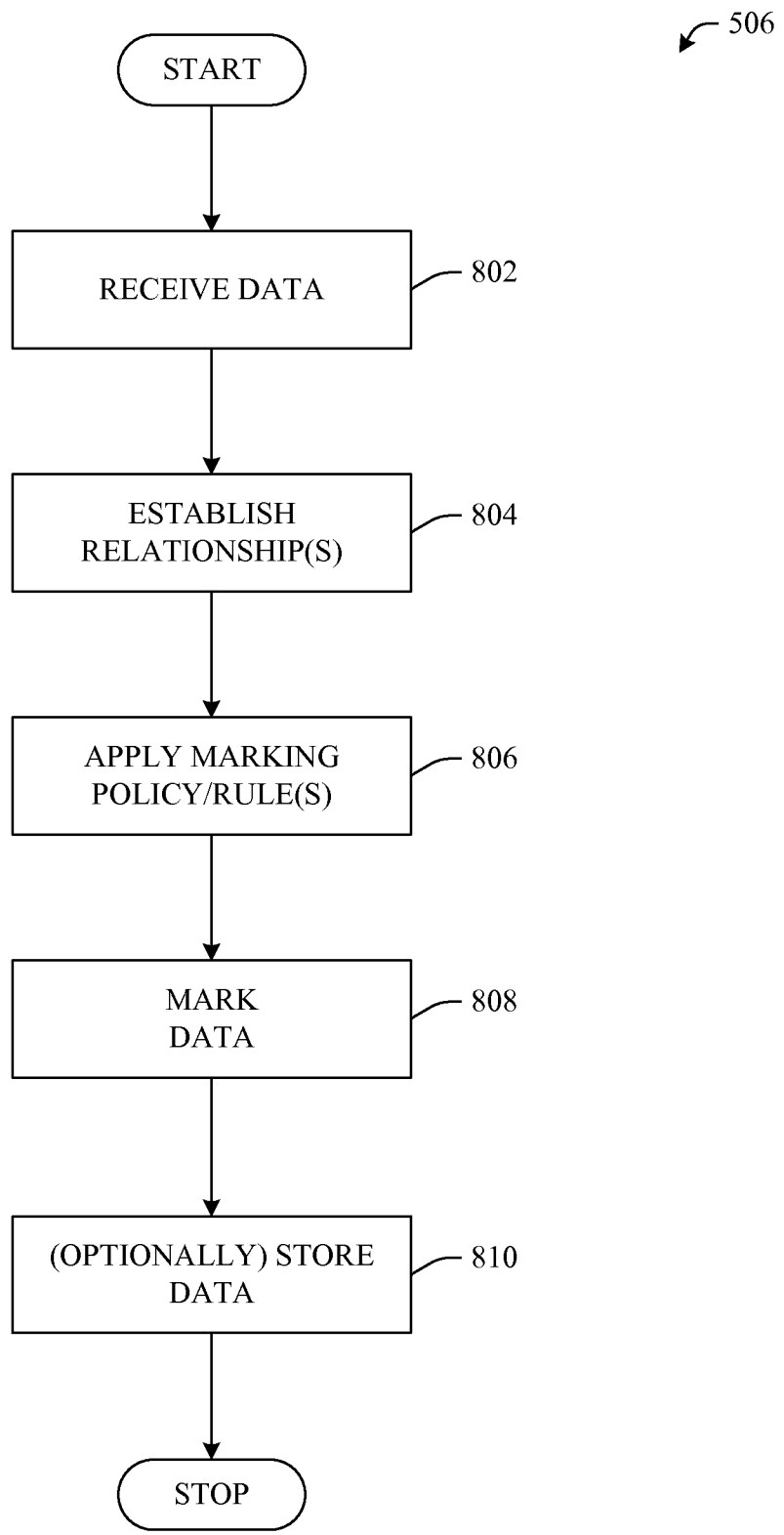
FIG. 8 illustrates an example flow diagram of procedures that facilitate marking of resource data in accordance with aspects of the specification.

Finally, at 708, this process data can be associated to resource data collected (e.g., from FIG. 6). In operation, the resource data can effectively be quantified as a function of production. As will be understood, this association enables an energy component in a BOM to be factored into decision making processes as well as revenue (and/or cost) calculations). FIG. 8 that follows describes a mechanism by which the raw resource data can be tagged or marked with descriptive data.

Referring now to FIG. 8, an example flow diagram of a methodology of marking (or tagging) data in accordance with aspects of the specification is shown. At 802, data is received—for example, process-related resource data together with data that describes the process and environment is received. Relationships between the data are established at 804. Here, the resource data can be related or otherwise associated to the descriptive data.

Marking rules can be accessed at 806. For example, rules can include identification of what information should be used for tagging, how to tag, when to tag, etc. Accordingly, at 808, the resource data can be marked with the process-related or descriptive data. As illustrated in FIG. 2, the number of tags can vary based upon most any factor including, but not limited to, relevance, type of process, type of resource, preference, regulation, etc. Optionally, at 810, the tagged data can be stored, for example, in a local store (e.g., within a sensor, server, network), remote store, distributed source, cloud-based store, or combinations thereof.

Figure 9:
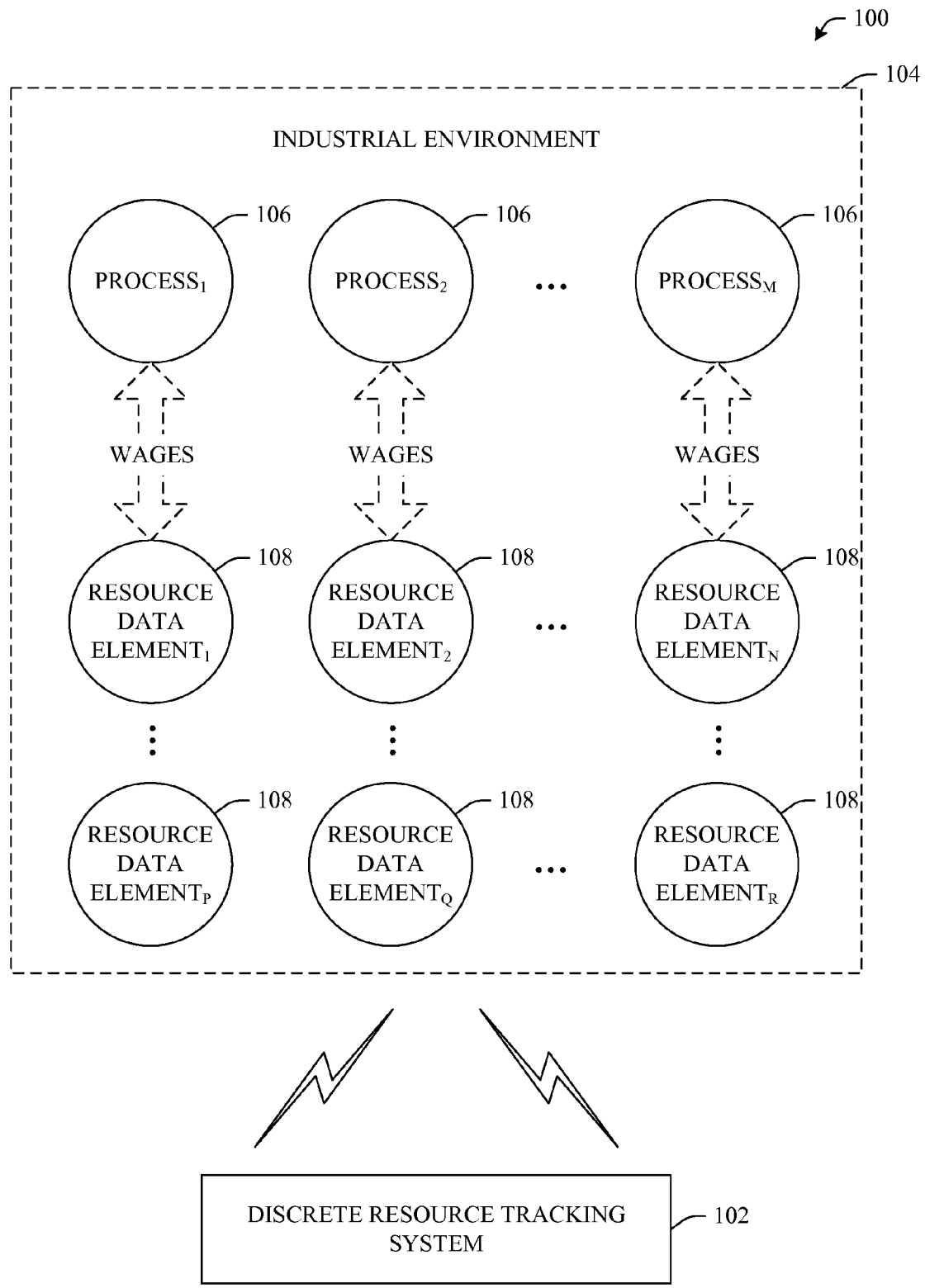
FIG. 9 illustrates an alternative example block diagram of a system that facilitates collection of resource data related to granular processes within an industrial environment.

Turning now to FIG. 9, an alternative example block diagram of system 100 is shown in accordance with aspects. Essentially, FIG. 9 illustrates that multiple resource data elements 108 can be collected from the 1 to M processes, where M is an integer. In particular, as shown, 1 to P, 1 to Q, and 1 to R elements can be collected from processes 1, 2 and M respectively, where P, Q and R are integers. Overall, it is to be understood that most any granularity as desired may be employed in aspects. It is further to be understood that many processes within an industrial environment can utilize a variety of resource components (e.g., WAGES). Thus, it is to be appreciated that the specification enables discrete tracking of each of the resource (e.g., energy) components independently as they relate to processes within an industrial environment.

Figure 10:
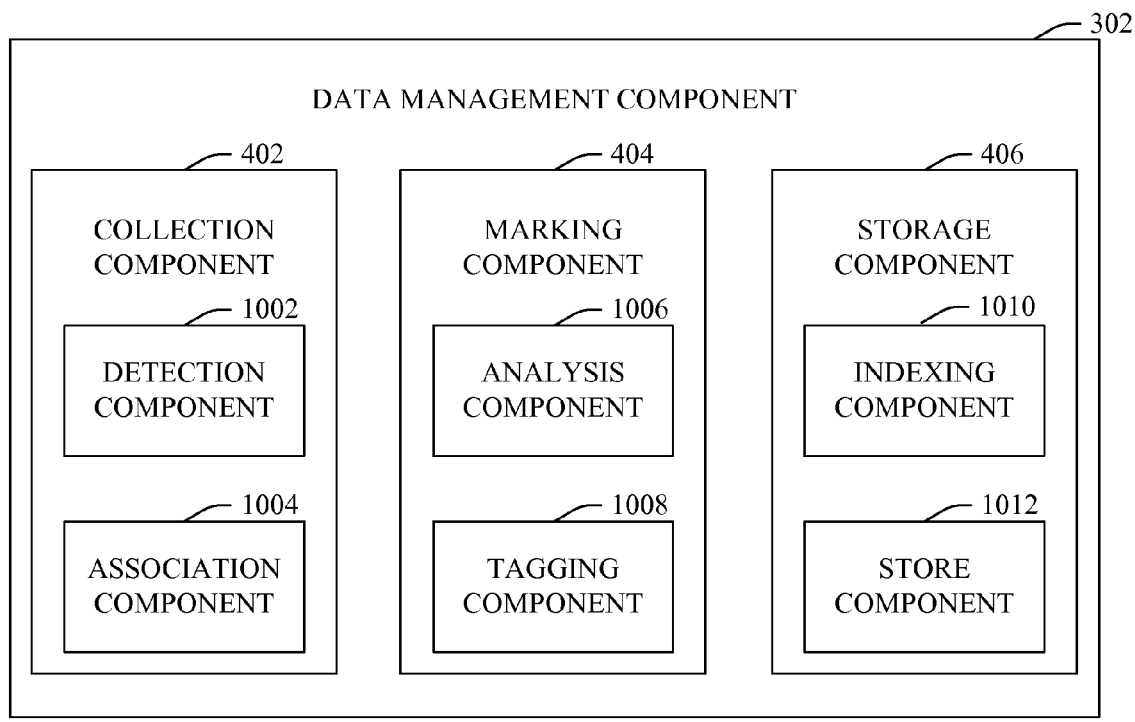
FIG. 10 illustrates an example data management component in accordance with aspects of the specification.

Referring now to FIG. 10, an example block diagram of data management component 302 in accordance with aspects of the specification. As illustrated, the collection component 402 can include a detection component 1002 and an association component 1004. Together, these sub-components (1002, 1004) can capture both resource data as well as descriptive data (e.g., process data, environment data, contextual data).

The detection component 1002 can employ or otherwise include a plurality of detectors or sensors configured to monitor processes within an industrial environment. It is to be understood that most any detector or sensor capable of capturing data can be employed in connection with aspects. For example, sensors manufactured by Rockwell Automation such as the Power Monitor 1000-brand sensor can be employed to collect power data in accordance with aspects of the specification. The association component 1004 is configured to associate resource data to process criteria. By way of example, the association component 1004 can establish that X amount of energy is used to manufacture Y number of widgets. It is to be understood that this is just one of countless examples of relating resource consumption/usage to processes (or sub-processes) in an industrial environment.

Turning attention now to the marking component 404, an analysis component 1006 and a tagging component 1008 can be employed to effect marking of resource data. In operation, the analysis component 1006 can evaluate the associations (e.g., from association component 1004) to thereafter facilitate marking by the tagging component 1008. As shown in FIG. 2, a resource data element can include most any number of tags as appropriate or desired. These tags enable applications and third party providers to manipulate or use the data in simulation, planning, forecasting, etc.

As described above, the tagged data can be stored for subsequent access or use, for example, by an application or third party service. The storage component can include an indexing component 1010 that establishes an index that enhances access to data within a store 1012 such as a local store, remote store, distributed source, cloud, etc.

As described supra, a useful application of the specification is the ability to quantify resource consumption/usage (e.g., water, air, electricity) for use as a BOM item in industrial environments. Every day manufacturers make scheduling decisions based on availability of materials and high cost of labor. As resource prices rise, it is helpful to include these factors into these scheduling decisions. Today, wrong or inefficient scheduling choices are costing producers tens, if not hundreds, of thousands of dollars in demand penalties and tariffs. Unfortunately, many manufacturers are not aware of these penalties and tariffs.

In accordance with the specification, many automated production lines can monitor some level of energy and/or water usage for startup profiles, maintaining recipe optimization, or for regulatory compliance. Manufacturers could, by applying discrete monitoring techniques, have the ability to make scheduling, forecasting and optimizing choices against resource demands through the use of standard production simulation tools. They could manipulate schedules to move orders that consume large amounts of energy to off peak pricing (e.g., load leveling). Also, in areas where energy has been deregulated, manufactures will be able to make wiser choices based on manufacturing schedules.

As described above, resource monitoring on the production floor tied to a resource tracking software package can correlate production output to the resources consumed. For example, energy could be metered and the empirical results could be added to the production BOM. It is to be understood that this allows the use of standard production simulation and forecasting tools, as well as, lean six sigma tools to enhance or optimize production against additional variable such as energy, rate schedules, and emissions and/or effluents.

In aspects, the specification facilitates production demand management. The typical electrical utility bill has a component for consumption, kilowatt-hours, and demand, average power over a pre-defined interval. The consumption charge is computed by multiplying the consumption amount by the applicable rate per kW-H. The rate can be constant or it can change based on the time of day, day of week, season, or current rate available in a de-regulated market.

A user can achieve consumption cost saving by improving the efficiency of the system and by shifting usage into a time period with a lower rate per kW-H. Demand charge calculation methods vary from utility to utility, but they are almost all based on measuring the average power over an interval, typically 15 or 30 minutes. In some instances a utility provides a signal to indicate the end/start of a discrete interval, and in some instances the interval is a continuously rolling window. The maximum recorded demand is then used to set the demand charge.

The charge may apply only for the month in which it was incurred, or it could apply for considerably longer, perhaps the next 12 months. Controlling demand charges is a more complicated process. It involves setting a peak demand limit that the user desires to stay below. The actual demand must then be continuously measured in real-time. The measured demand is used to project what the average power will be at the end of the time interval. If the projected demand equals or exceeds the user defined peak demand limit, action is required. The action could be as simple as manually turning off one or more loads until the next interval begins, or it could involve an automated process.

An automated process is usually chosen since it can continuously monitor the situation and react quickly without intervention. The process usually involves identifying various loads that can be shut down for a short time and prioritizing them. The automated system will then shed loads starting with the lowest priority load until the projected demand is below the limit. Once a new interval begins, the automated system can re-apply the loads, typically in reverse order, to allow normal system operation. In an industrial facility the production equipment is usually not considered a shed-able load since this would disrupt the manufacturing process. Most often selected loads involve thermal storage such as HVAC or refrigeration, energy storage such as air compressors, or lighting loads.

This strategy can successfully reduce a facility's electric bill, but it does not go far enough. The approach assumes that the supply of electricity is unlimited up to the capacity of the connected electrical distribution equipment and it does nothing to help optimize the cost per unit for the products being produced. As described herein, to improve this method, additional metering of the system can be used. The additional metering provides enough granularities for the user to measure the energy used by various elements within a process or manufacturing system under a variety of operating conditions.

With this information and the applicable utility rate structure, the user can now construct a more complete breakdown of the true cost per unit for the output of the facility. It is now possible to construct a mathematical model that includes cost of raw materials, amortization of capital equipment, floor space, labor, prioritized production requirements, and energy. The output of the model allows control choices to be made that manage output requirements and energy (and/or water usage) while also optimizing the economic return to the company.

The availability of the resource (e.g., energy) requirement profile for various components of the manufacturing line or process also enables an enhancement to the control process. As stated above, the typical method for controlling energy costs is simply turning on or off various portions of a facility. However, in many cases there is another alternative that may be more desirable. Instead of viewing the controllable elements as being either on or off, they can be controlled to operate along the continuum between those two states. In other words, the production line or process can be "modulated" based on the mathematical model.

A simple example will illustrate the concept. Suppose the facility produces a product that must be heated in an oven for a specific amount of time in order to cure or cook it. In previous systems, when the cost or availability of energy was not a significant concern, the system would be designed to produce the most finished product possible in the least amount of time while maintaining acceptable quality. This usually provided the best return for the cost expended. In the current higher cost of energy environment this may no longer be true. It may now be a better economic decision to reduce the temperature in the oven and increase the time when the cost of energy is higher. This modulation of the system produces fewer products per unit of time. However, if properly driven by the mathematical model the return on investment can be maximized.

What has been described above includes examples of the specification. It is, of course, not possible to describe every conceivable combination of components or methodologies for purposes of describing the subject specification, but one of ordinary skill in the art may recognize that many further combinations and permutations of the specification are possible. Accordingly, the specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates discrete resource management, comprising:
    at least one processor coupled to memory retaining instructions carried out by the at least one processor, in operation, for:
        a collection component that, in operation, obtains a plurality of process-related resource data elements from a plurality of autonomous sensor components disposed at a plurality of locations within an industrial environment, wherein each process-related resource data element comprises a value quantifying a water consumption, an energy consumption, or both of one of a plurality of defined processes of the industrial environment, wherein each of the plurality of defined processes is configured to contribute to production of a product;
        a marking component that, in operation, associates each of the plurality of process-related resource data elements with descriptive data, wherein the descriptive data comprises environmental conditions, a rate of production, a duration of production, or any combination thereof for at least one manufacturing process of the plurality of defined processes configured to contribute to the production of the product; and an analysis component that, in operation:

quantifies a subset of the plurality of process-related resource data elements to produce a bill of materials (BOM) per unit comprising a cost associated to the water consumption, a cost associated to the energy consumption, or both as a function of an amount of the product produced by the at least one process of the plurality of defined processes, wherein the subset of the plurality of process-related resource data elements is quantified with respect to the descriptive data;

adjust the BOM per unit to reduce the cost associated to the water consumption or a cost associated to the energy consumption, or both; and automatically adjusts the rate of production or the duration of production for the at least one manufacturing process by automatically adjusting at least one load associated with the process based at least on the adjusted BOM per unit, wherein the at least one load comprises a water consumption load, an energy consumption load, or both.

2. The system of claim 1, wherein each of the plurality of process-related resource data elements is initiated within its respective defined process within the industrial environment.

3. The system of claim 1, further comprising a storage component that, in operation, facilitates retaining the plurality of process-related resource data elements and the descriptive data.

4. The system of claim 3, wherein the storage component is located in at least one of a local, remote, distributed or cloud-based store.

5. The system of claim 3, further comprising an indexing component that, in operation, records a location of each of the plurality of process-related resource data elements within a store.

6. The system of claim 1, further comprising a detection component that comprises the plurality of autonomous sensor components and, in operation, monitors the industrial environment to gather the plurality of process-related resource data elements.

7. The system of claim 1, further comprising an association component that, in operation, associates each of the plurality of process-related resource data elements with the descriptive data based at least upon production level.

8. The system of claim 1, wherein the marking component comprises:

an analysis component that, in operation, determines one or more relationships between the descriptive data and each of the plurality of process-related resource data elements; and a tagging component that, in operation, marks each of the plurality of process-related resource data elements with descriptive data based on the one or more relationships.

9. A non-transitory, computer-readable medium comprising executable code comprising instructions to:

receive a plurality of process-related resource data elements from a plurality of autonomous sensor components disposed at a plurality of locations within an industrial environment, wherein each process-related resource data element of the plurality of process-related resource data elements comprises a value quantifying an energy consumption, water consumption, or any combination thereof, of a manufacturing process of a plurality of discrete processes of the industrial environment, wherein each of the plurality of discrete processes is configured to contribute to production of a product;

receive a plurality of process-related contextual data elements comprising descriptive data comprising environmental conditions, a time of production, an utility rate, or any combination thereof for the manufacturing process;

associate each of the plurality of process-related resource data elements with the plurality of process-related contextual data elements;

quantify the plurality of process-related resource data elements to produce a bill of material (BOM) per unit, wherein the BOM per unit comprises a cost associated to energy consumption, water consumption or both as a function of a rate of production, a duration of production, or both of the manufacturing process, and wherein the plurality of process-related resource data elements is quantified with respect to the descriptive data;

adjust the BOM per unit to reduce the cost associated to the water consumption, a cost associated to the energy consumption, or both; and automatically adjust the rate of production, the duration of production of both of the manufacturing process by automatically adjusting at least one load associated with the process based on the adjusted BOM per unit, wherein the at least one load comprises a water consumption load, an energy consumption load, or both.

10. The non-transitory, computer-readable medium of claim 9, further comprising instructions configured to store the plurality of process-related resource data elements.

11. The non-transitory, computer-readable medium of claim 10, further comprising instructions configured to index each of the plurality of process-related resource data elements.

12. The non-transitory, computer-readable medium of claim 9, further comprising instructions configured to relate a subset of the plurality of process-related contextual data elements to each of the plurality of process-related resource data elements.

13. The non-transitory, computer-readable medium of claim 9, wherein the instructions comprise automatically adjusting the time of production to reduce the cost associated to the energy consumption or the water consumption of the BOM per unit.

14. A method, comprising:

obtaining resource data comprising one or more values quantifying emissions, effluents, or any combination thereof, of at least one manufacturing process of a plurality of processes within an industrial environment from a plurality of autonomous sensor components disposed at a plurality of locations within the industrial environment, wherein each of the plurality of processes is configured to contribute to production of a product;

obtaining contextual data describing a time of production, an environmental condition, or any combination thereof for at least one of the plurality of processes;

associating a subset of the resource data with a subset of the contextual data based on one or more relationships between the subset of the resource data and the subset of the contextual data;

quantifying the subset of the resource data to produce a bill of materials (BOM) per unit as a function of a rate of production, a duration of production, or both for the at least one manufacturing process, wherein the subset of the resource data is quantified with respect to the subset of the contextual data and at least one regulatory requirement, and wherein the BOM per unit comprises a regulatory cost per unit;

adjust the BOM per unit to reduce the regulatory cost per unit; and automatically adjusting the rate of production, the duration of production, or both for the at least one manufacturing process by automatically adjusting at least one load associated with the process based on the adjusted BOM per unit, wherein the at least one load comprises a water consumption load, an energy consumption load, or both.

15. The method of claim 14, further comprising tagging the subset of the resource data with the subset of the contextual data.

16. The method of claim 15, further comprising storing the subset of the resource data in at least one of a local, remote, distributed or cloud-based store.

17. The method of claim 16, further comprising indexing the subset of the resource data.

18. The method of claim 14, further comprising monitoring the plurality of processes to facilitate obtaining the resource data or the contextual data.

19. The method of claim 14, wherein the regulatory cost per unit comprises a Cap and Trade/Tax system.

* * * * *